United States Patent
Zimmermann et al.

(10) Patent No.: US 8,442,726 B2
(45) Date of Patent: May 14, 2013

(54) METHOD AND DEVICE FOR LESSENING THE CONSEQUENCES OF AN ACCIDENT ON A VEHICLE OCCUPANT

(75) Inventors: Markus Zimmermann, Munich (DE); Christian Gruber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/533,162

(22) Filed: Jun. 26, 2012

(65) Prior Publication Data

US 2012/0265407 A1    Oct. 18, 2012

Related U.S. Application Data

(63) Continuation of application No. PCT/EP2010/007412, filed on Dec. 7, 2010.

(30) Foreign Application Priority Data

Jan. 22, 2010 (DE) .......................... 10 2010 005 408

(51) Int. Cl.
*B60R 22/00* (2006.01)

(52) U.S. Cl.
USPC ............. 701/45; 701/424; 701/301; 340/436; 340/903; 340/438; 180/271; 280/734

(58) Field of Classification Search ............ 701/45, 701/502, 423, 424, 301; 340/903, 425.5, 340/435, 436, 438; 180/271; 280/734, 735
See application file for complete search history.

(56) References Cited

U.S. PATENT DOCUMENTS

| | | | |
|---|---|---|---|
| 5,626,203 A | 5/1997 | Habib | |
| 6,531,959 B1 * | 3/2003 | Nagaoka et al. | 340/435 |
| 2003/0075907 A1 | 4/2003 | Baumann et al. | |
| 2007/0185635 A1 | 8/2007 | Mattes et al. | |
| 2007/0200323 A1 | 8/2007 | Bertele et al. | |
| 2008/0082233 A1 * | 4/2008 | Hayashi | 701/36 |
| 2010/0090448 A1 | 4/2010 | Pursche et al. | |
| 2012/0095674 A1 * | 4/2012 | Lee et al. | 701/423 |

FOREIGN PATENT DOCUMENTS

| | | |
|---|---|---|
| DE | 43 23 543 C1 | 10/1994 |
| DE | 198 20 214 A1 | 11/1999 |
| DE | 101 39 609 C1 | 8/2002 |
| DE | 102 24 831 A1 | 12/2003 |
| DE | 103 21 871 A1 | 12/2004 |

(Continued)

OTHER PUBLICATIONS

German Search Report dated May 4, 2010 including partial English-language translation (Nine (9) pages).
International Search Report dated Mar. 2, 2011 including English-language translation (Four (4) pages).

*Primary Examiner* — Gertrude Arthur Jeanglaude
(74) *Attorney, Agent, or Firm* — Crowell & Moring LLP

(57) ABSTRACT

A method and device are provided for lessening the consequences of an accident affecting a vehicle occupant in the event of a collision of the vehicle with an obstruction. Before the collision, the absolute speed of the vehicle occupant relative to the obstruction is reduced independently of the traveling speed of the vehicle by way of a reduction of the vehicle occupant's speed relative to the vehicle, without the vehicle occupant experiencing a first displacement movement against the vehicle movement direction beyond his initial destination-related traveling position.

11 Claims, 2 Drawing Sheets

FOREIGN PATENT DOCUMENTS

| DE | 103 53 446 B4 | 9/2005 |
| DE | 10 2004 012 880 A1 | 10/2005 |
| DE | 10 2005 058 924 A1 | 6/2007 |
| WO | WO 2008/110610 A1 | 9/2008 |

* cited by examiner

METHOD AND DEVICE FOR LESSENING THE CONSEQUENCES OF AN ACCIDENT ON A VEHICLE OCCUPANT

CROSS-REFERENCE TO RELATED APPLICATIONS

This application is a continuation of PCT International Application No. PCT/EP2010/007412, filed Dec. 7, 2010, which claims priority under 35 U.S.C. §119 from German Patent Application No. DE 10 2010 005 408.9, filed Jan. 22, 2010, the entire disclosures of which are herein expressly incorporated by reference.

BACKGROUND AND SUMMARY OF THE INVENTION

The present invention relates to a method of lessening the consequences of an accident affecting a vehicle occupant in the event of a collision of the vehicle with an obstruction. Furthermore, the invention relates to a device for implementing the method.

Restraining devices in vehicles are known to reduce the consequences affecting the occupant in the event of a collision of the vehicle with an obstruction. Such known systems normally include belt systems and airbag systems. The belt systems have a tightener function which tightens the belt (safety belt) placed against the vehicle occupant at the moment or before the moment of the collision of the vehicle with an obstruction. The known airbags are, for example, a front airbag, a knee airbag, a side airbag, a thorax airbag or the like, which are provided for the driver as well as for the front passenger.

These restraining systems contribute considerably to reducing the risk of injury to vehicle occupants. However, such restraining systems have the potential to be improved.

A typical collision situation may be one wherein the vehicle collides frontally with a stationary obstruction or with an oncoming vehicle. At the moment of the collision, the vehicle occupant is sitting in his seat in the vehicle and his back is in contact with the back surface of the seat. As a result of his inert mass, the vehicle occupant experiences a displacing motion at the point-in-time of the collision in the direction of the vehicle movement and is then held back, i.e. restrained, by the restraining system. In this case, the vehicle occupant is braked from a speed corresponding to the vehicle speed to a speed that is equal to zero and, during this time period, is acted upon by a force corresponding to the product of his mass and the acceleration occurring during the braking operation.

Such a restraining system is an element from the sphere of passive safety, which concerns measures lessening the consequences of accidents. A further element from the sphere of vehicle safety is the so-called active safety which starts with the avoidance of accidents in order to reduce the frequency of accidents. Both disciplines are components of integral safety, which relates to the entire accident escalation chain and looks at the effectiveness of protective devices and the improvement of the potential of protecting all traffic participants.

One component of such current development endeavors is the recognition of danger situations during the normal driving situation before an accident occurs in order to initiate measures of active and passive safety systems in time. These include, for example, early-recognition systems, which operate, for example, cameras, radar or vehicle-to-vehicle communication and begin with the initiation of protective measures before the actual accident occurs. As mentioned above, the vehicle occupant is accelerated from the time of the start of the accident in the direction opposite to that of the collision partner; i.e. the vehicle occupant is decelerated in order to brake as smoothly as possible.

With respect to the loads acting upon the vehicle occupant, the change of speed and the time period available for this purpose—in other words, the available length of the braking path—are therefore relevant.

It is an object of the invention to provide a method and a device for reducing the consequences of an accident affecting a vehicle occupant in the event of a collision of the vehicle with an obstruction.

This and other objects are achieved by a method and device according to the invention. The invention provides a method and device for lessening the consequences of an accident affecting a vehicle occupant in the event of a collision of the vehicle with an obstruction, in which case, before the collision, the absolute speed of the vehicle occupant relative to the obstruction is reduced independently of the traveling speed of the vehicle by way of a reduction of the vehicle occupant's speed relative to the vehicle, without the vehicle occupant experiencing a first displacement movement against the vehicle movement direction beyond his normal initial destination-related traveling position.

The present invention is based on the fundamental idea of reducing the speed difference, which the vehicle occupant experiences between the point-in-time of the collision and the stoppage of the vehicle, and thereby reducing the force load acting upon the vehicle occupant, specifically such that the vehicle occupant does not experience a first displacement movement against the vehicle moving direction beyond his normal, i.e. destination-related, initial position. Thus, according to the method of the invention, viewed in the moving direction of the vehicle, the vehicle occupant is at first not displaced toward the rear beyond his initial position taken up under normal destination-related traveling conditions in the direction against the moving direction of the vehicle.

This approach is based on the surprising discovery that a considerably lower stressing of the vehicle occupant takes place if the vehicle occupant is not accelerated at the beginning of the accident into a direction opposite to that of the collision partner, but the vehicle occupant is accelerated before the actual collision of the vehicle with the obstruction in the direction of the collision partner and, in the process, passes through a forward displacement movement and, only after this forward displacement movement, experiences a backward displacement movement directed against the collision partner.

According to a further development of the invention, the operation of devices is provided for this purpose, which devices accelerate the vehicle occupant in a first time period before the collision to an absolute speed which is higher than the traveling speed of the vehicle, and which devices brake the vehicle occupant in a second time period before the collision to a speed below the traveling speed of the vehicle during the collision with the obstruction.

In other words, this means that the vehicle occupant experiences a forward displacement movement before the actual collision and is subsequently braked again in that he is accelerated away from the collision partner. As a result, the vehicle occupant experiences a backward displacement movement and, at the point-in-time of the collision, is again situated closer to his initial position before the accident—thus, his destination-related sitting position—but now at a clearly reduced speed measured relative to the collision partner, thus the obstruction.

In this manner, the absolute speed of the vehicle occupant at the point-in-time of the accident, thus the point-in-time of the collision of the vehicle with the obstruction, is reduced independently of the traveling speed of the vehicle, and the vehicle occupant therefore experiences no first displacement movement against the movement direction of the vehicle—thus, viewed in the direction toward the rear in the case of a frontal collision—beyond his normal and destination-related initial position.

In this manner, the case is also taken into account in which it is assumed that the vehicle occupant cannot be displaced significantly toward the rear, therefore from his normal and destination-related initial position, relative to the moving direction of the vehicle, thus cannot be preconditioned, before the point-in-time of the accident, because, for example, luggage or other vehicle occupants are situated behind the vehicle occupant, whose legs must not be injured by a significant backward displacement of the seat backrest of the vehicle occupant in the direction toward the rear.

Thus, in a first time period before the collision of the vehicle with the obstruction, the vehicle occupant at first experiences an acceleration in the direction toward the collision partner, is then accelerated toward the rear opposite to this movement direction, so that the speed of the vehicle occupant relative to the obstruction at the point-in-time of the collision will be below the speed of the vehicle at the point-in-time of the collision, and the acceleration component acting upon the vehicle occupant until the vehicle stops will therefore clearly be lower than a comparable acceleration component which would occur if, at the point-in-time of the collision, the vehicle occupant were to have a speed relative to the obstruction that corresponds to the traveling speed of the vehicle.

The course of the accident occurring after the collision takes place with the further aid of the restraining system with the advantage of a clearly lower change of speed through which the vehicle occupant has to pass, so that his average deceleration is considerably reduced, and the load affecting the vehicle occupant will clearly decrease.

According to a further aspect of the invention, it is provided that the devices accelerate the vehicle occupant to carry out a displacement movement in/or against the vehicle moving direction with, in each case, a largely consistent amount of acceleration. This means, in other words, that the devices affecting the vehicle occupant act upon the vehicle occupant such that, during his forward displacement movement, the vehicle occupant is acted upon by a largely consistent acceleration and, also during his backward displacement movement, during a second time period, the vehicle occupant is acted upon against the vehicle moving direction by a largely consistent acceleration, so that load peaks originating from acceleration peaks can largely be avoided.

According to a further aspect of the invention, it is provided that the devices act upon the vehicle occupant during the first time period by an acceleration factor of less than or equal to largely six times the gravitational acceleration. As a result, it is ensured that, during his forward displacement movement, the vehicle occupant will experience no forces that could present a risk of injury.

According to a further aspect of the invention, it is provided that the devices, during the second time period, act upon a vehicle occupant by an acceleration factor such that, before the collision, the vehicle occupant will experience and maintain a negative speed relative to the vehicle. It is thereby achieved that, during his movement directed opposite to the movement direction of the vehicle, the vehicle occupant will not be braked again by the backrest of his seat to such an extent that his speed relative to the obstruction will again correspond to the traveling speed of the vehicle. In other words, it is thereby achieved that the vehicle occupant is not coupled onto the seat backrest such that his movement component in the backward direction is completely terminated. For this purpose, if there is sufficient space behind the seat backrest, which can be recognized, for example, by a seat occupation detector of an additional seat arranged behind the vehicle occupant seat, then the seat backrest can also be displaced in the backward direction.

The second time period with the backward displacement movement of the vehicle occupant starts before a physical contact of the vehicle occupant with an approximately rigid body of the vehicle, such as the steering wheel, so that the vehicle occupant's forward displacement induced during the first time period will be terminated before the vehicle occupant comes in contact with this rigid body.

In general, it is provided according to the method of the invention that the devices act upon the vehicle occupant such that, during the first and second time periods, the latter remains with his upper body in the vehicle moving direction in the area between a steering device and a seating device of the vehicle. During the first and second time periods, the vehicle occupant therefore does not come in contact with the control device of the vehicle representing a largely rigid body and, at the point-in-time of the collision, is also not yet again in contact with the seating device of the vehicle such that his speed component relative to the vehicle is reduced to zero.

If these conditions are expressed using the displacement path available to the vehicle occupant, a forward displacement path takes place first, on which a backward displacement path provided with a negative preceding sign is superimposed, so that the amount of the path covered during the displacement movements is smaller than the maximally permissible backward displacement path.

At the collision point-in-time, the vehicle occupant still has a movement component relative to the vehicle against the vehicle movement direction and then, because of the collision momentum, experiences a second forward displacement movement which is absorbed again by the restraining system. The amount from the first forward displacement path and the backward displacement path as well as the second forward displacement path is therefore smaller than the maximally permissible forward displacement path, which is determined in the vehicle movement direction by a rigid body, for example, the above-mentioned steering wheel of the vehicle.

In this case, the average deceleration acting upon the vehicle occupant is significantly lower than the average deceleration resulting from the classic course of an accident in the case of a restraining system according to the state of the art. The classic course of an accident consists of the fact that, at the collision point-in-time, the vehicle occupant at first still experiences a movement component in the forward direction and then experiences an acceleration which accelerates him in the opposite direction of the collision partner.

Furthermore, the invention provides that the devices are components of a vehicle occupant restraining system and, according to a preferred embodiment, for accelerating the vehicle occupant during the first time period, includes a gas (air) bag, and the devices for accelerating the vehicle occupant in the second time period include a belt and/or a gas bag.

For the acceleration, i.e. for the forward-directed movement of the vehicle occupant during the first time period, an airbag can therefore be used that is integrated in the backrest of the seat of the vehicle occupant, and during the second time period, the vehicle occupant can be braked by a safety belt and/or a gas bag integrated in the steering wheel of the vehicle or can be accelerated toward the rear against the vehicle movement direction.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
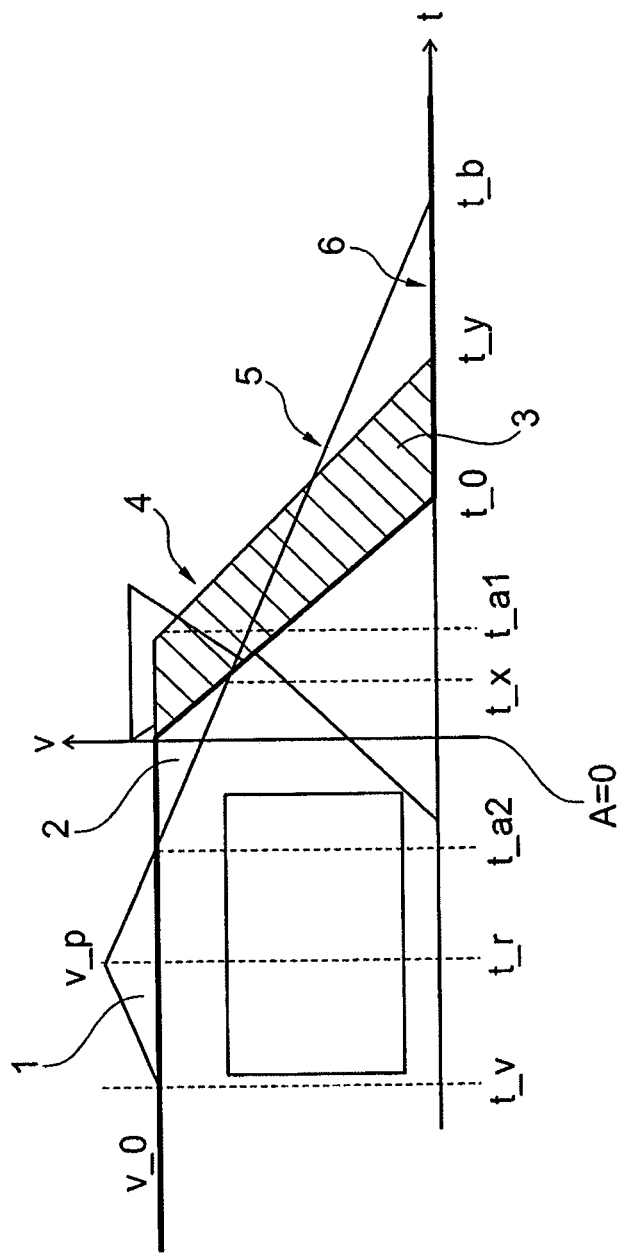
FIG. 1 is a diagram of speed versus time for explaining the method according to the invention.

A vehicle (not shown in detail), in which a vehicle occupant is sitting, is moving at a speed $v\_0$, which in the graphic illustration of FIG. 1 corresponds to the thick solid black line having the reference number 6. At the point-in-time t=0, a collision of the vehicle with an obstruction takes place. Such a no longer avoidable accident situation is already detected, for example, by way of a camera-based detection system of the vehicle before the accident occurs so that the measures according to the invention can be initiated before the accident.

Figure 2:
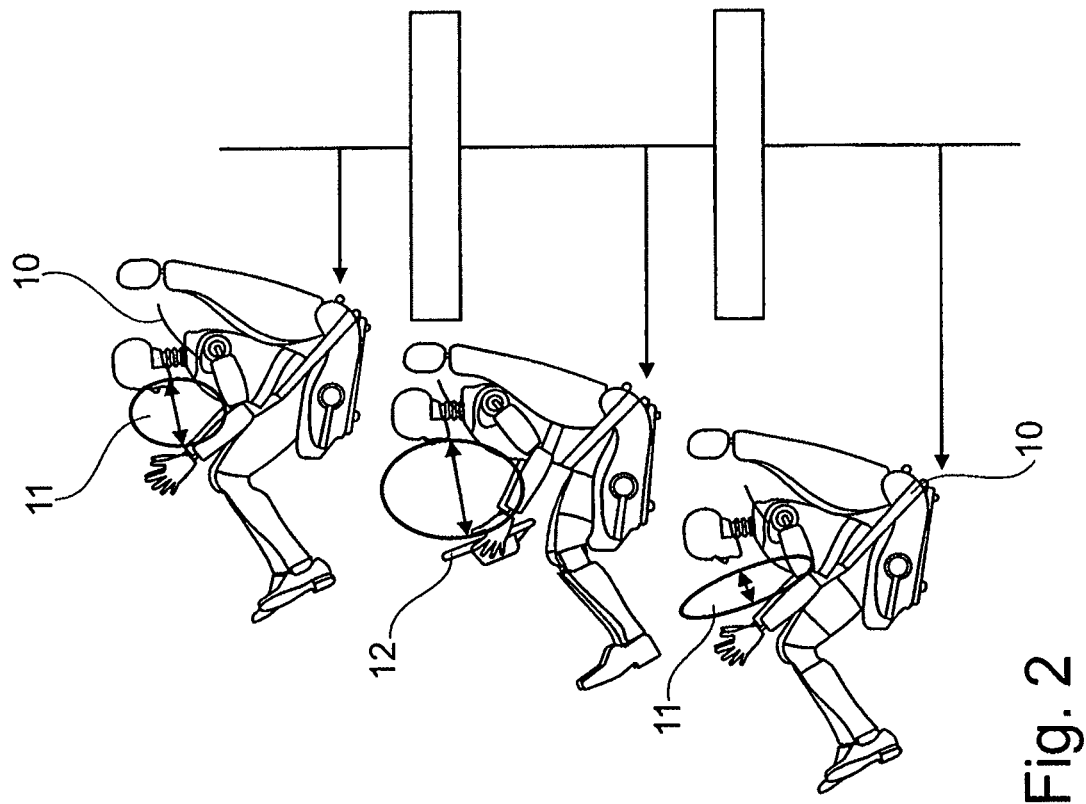
FIG. 2 is a schematic diagram illustrating the positions of a vehicle occupant during the preconditioning and the course of an accident.
Figure 2:
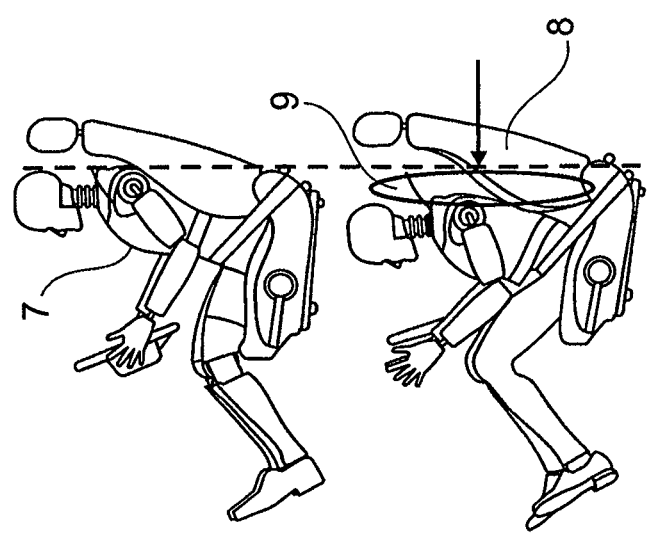

The speed of the vehicle and the vehicle occupant 7, who is schematically illustrated in FIG. 2, during normal and destination-related travel, for which the vehicle occupant 7 also has an initial seated position, also amount to $v\_0$, i.e. the absolute speed of the vehicle and the vehicle occupant 7 relative to the obstruction coincide far before the point-in-time of the accident.

It was determined by way of a detection system of the vehicle that a collision with the obstruction can no longer be avoided, and, at the point-in-time $t\_v<0$, the vehicle occupant is accelerated in the direction toward the collision partner, in which case, a seat airbag 9 may be provided, for example, in the seat backrest 8 for this purpose (see FIG. 2).

This causes the vehicle occupant's speed to increase relative to the vehicle speed; the vehicle occupant has a speed $v\_p$ and experiences a forward displacement 1, and, at the point-in-time $t\_r$, the vehicle occupant is accelerated again in the direction away from the collision partner, in which case the safety belt 10 illustrated in FIG. 2 can be used for this purpose.

Optionally or in addition to the safety belt 10, an airbag 11 integrated in the steering wheel 12 can be used for accelerating the vehicle occupant in the direction away from the collision partner. In the case that the safety belt 10 alone is sufficient for initiating a backward displacement movement of the vehicle occupant 7, it is preferred that this action be caused by the safety belt 10 alone.

As illustrated in FIG. 1, the vehicle occupant experiences a negative relative speed along the backward displacement path 2 relative to the vehicle, and the vehicle occupant's speed illustrated by the speed course 5 is lower at the collision point-in-time t=0 than the vehicle speed $v\_0$. In the first time period $t\_v$ to $t\_r$, the vehicle occupant is therefore accelerated in the direction toward the collision partner and, during the second time period $t\_r$ to $t\_x$, is accelerated in the direction away from the collision partner.

Finally, during the time period $t\_x$ to $t\_b$, the vehicle occupant experiences a second forward displacement movement 3 corresponding to the classic course of an accident and is braked here by the safety belt 10 as well as by the airbag 11.

In this case, the safety belt 10 unblocks the path during the time period $t\_x$ to $t\_b$, while the load is controlled, and the distance between the vehicle occupant 7 and the steering wheel 12 decreases again.

As further illustrated in FIG. 1, the course 4 of the curve illustrates the course of the vehicle occupant's speed in the case of a known restraining system; i.e., from the collision point-in-time t=0 to the point-in-time $t\_a1$, because of his inert mass, the vehicle occupant experiences a still further displacement movement in the direction toward the steering wheel and is then accelerated by the known restraining system in the direction away from the collision partner until the point-in-time $t\_y$, and during this time period $t\_a1$ to $t\_y$, the vehicle occupant has to absorb the force originating from the negative acceleration.

In contrast, according to the method of the invention, the time period $t\_a2$ to $t\_b$ is available which is significantly longer than the above-mentioned time period according to the known method, which indicates that the average deceleration of the vehicle occupant is lower and the vehicle occupant can therefore be significantly relieved with respect to the load.

Concerning characteristics of the invention not explained above in detail, reference is explicitly made to the corresponding drawings.

LIST OF REFERENCE NUMBERS

1 Forward displacement path
2 Backward displacement path
3 Forward displacement path
4 Speed
5 Speed
6 Vehicle speed
7 Vehicle occupant
8 Seat backrest
9 Airbag
10 Safety belt
11 Airbag
12 Steering wheel The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of lessening consequences of an accident affecting a vehicle occupant in an event of a collision of a vehicle with an obstruction, the method comprising the acts of:

detecting an imminent collision of the vehicle; and
    before the collision occurs, reducing an absolute speed of the vehicle occupant relative to the obstruction independently of a traveling speed of the vehicle by way of a reduction of a speed of the vehicle occupant relative to the vehicle without the vehicle occupant experiencing a first displacement movement against a vehicle movement direction beyond an initial destination-related traveling position,
    wherein the act of reducing the absolute speed of the vehicle occupant relative to the obstruction further comprises the acts of:
        accelerating the vehicle occupant in a first time period before the collision to an absolute speed higher than the traveling speed of the vehicle; and braking the vehicle occupant in a second time period before the collision to a speed below the traveling speed of the vehicle during the collision with the obstruction.

2. The method according to claim 1, wherein displacement movements in the first and second time periods occur, in each case, with a largely consistent amount of acceleration.

3. The method according to claim 2, wherein devices act upon the vehicle occupant during the first time period to accelerate the vehicle occupant by an acceleration factor of less than or equal to largely six times the gravitational acceleration.

4. The method according to claim 2, wherein devices for braking the vehicle occupant act, during the second time period, upon the vehicle occupant by an acceleration factor such that, before the collision, the vehicle occupant experiences and maintains a negative speed relative to the vehicle.

5. The method according to claim 3, wherein devices for braking the vehicle occupant act, during the second time period, upon the vehicle occupant by an acceleration factor such that, before the collision, the vehicle occupant experiences and maintains a negative speed relative to the vehicle.

6. The method according to claim 5, wherein devices act upon the vehicle occupant such that, during the first and second time periods, an upper body of the vehicle occupant is maintained in a moving direction of the vehicle in an area between a steering wheel and a seating device of the vehicle.

7. A system for lessening consequences of an accident affecting a vehicle occupant in an event of a collision with a vehicle with an obstruction, the system comprising:
  a collision detector that detects an imminent collision of the vehicle with the obstruction; and
  a vehicle occupant restraining system comprising a vehicle occupant accelerator that, before an occurrence of the collision, accelerates the vehicle occupant in a first time period before the collision to an absolute speed higher than a traveling speed of the vehicle, and brakes the vehicle occupant in a second time period before the collision to a speed below the traveling speed of the vehicle during the collision with the obstruction.

8. The system according to claim 7, wherein the vehicle occupant restraining system utilizes a gas bag for accelerating the vehicle occupant during the first time period, and utilizes at least one of a belt system and gas bag for braking the vehicle occupant in the second time period.

9. A method of operating a vehicle occupant restraining system to reduce consequences of an accident affecting a vehicle occupant in an event of a collision of the vehicle with an obstruction, the method comprising the acts of:
  detecting an imminent collision of the vehicle with an obstruction;
  upon detecting the imminent collision, accelerating the vehicle occupant in a forward direction of the vehicle in a first time period before the collision to an absolute speed higher than a forward traveling speed of the vehicle; and
  subsequently accelerating the vehicle occupant in a backward direction in a second time period before the collision to a speed below the traveling speed of the vehicle during the collision with the obstruction.

10. The method according to claim 9, wherein the act of accelerating the vehicle occupant in the forward direction is carried out via a gas bag arranged at least partially behind the vehicle occupant.

11. The method according to claim 10, wherein the act of accelerating the vehicle occupant in the backward direction is carried out by at least one of a belt system and a gas bag provided at least partially in front of the vehicle occupant.

* * * * *